US008511918B2

(12) United States Patent
Aab

(10) Patent No.: US 8,511,918 B2
(45) Date of Patent: Aug. 20, 2013

(54) CENTRAL SHUTTER FOR CAMERA OBJECTIVES

(75) Inventor: Konstantin Aab, Edermünde-Grifte (DE)

(73) Assignee: Leica Camera AG, Soloms (DE)

( * ) Notice: Subject to any disclaimer, the term of this patent is extended or adjusted under 35 U.S.C. 154(b) by 92 days.

(21) Appl. No.: 13/147,852

(22) PCT Filed: Feb. 2, 2010

(86) PCT No.: PCT/EP2010/000605
§ 371 (c)(1),
(2), (4) Date: Aug. 4, 2011

(87) PCT Pub. No.: WO2010/089075
PCT Pub. Date: Aug. 12, 2010

(65) Prior Publication Data
US 2011/0293263 A1  Dec. 1, 2011

(30) Foreign Application Priority Data

Feb. 5, 2009 (DE) .................... 20 2009 009 522 U
Jun. 15, 2009 (DE) ........................ 10 2009 025 320

(51) Int. Cl.
*G03B 9/20* (2006.01)
(52) U.S. Cl.
USPC ........................................................ 396/497
(58) Field of Classification Search
USPC ................ 396/463, 470, 497, 498, 500
See application file for complete search history.

(56) References Cited

U.S. PATENT DOCUMENTS

| 2,269,400 | A | | 1/1942 | Steiner | |
|---|---|---|---|---|---|
| 3,089,400 | A | * | 5/1963 | Kiper | 396/497 |
| 3,164,007 | A | | 1/1965 | Mulats | |
| 3,199,427 | A | * | 8/1965 | Gorey | 396/443 |
| 3,379,109 | A | | 4/1968 | Bertram | |
| 2003/0161625 | A1 | | 8/2003 | Kamata | |
| 2011/0293263 | A1 | * | 12/2011 | Aab | 396/470 |

FOREIGN PATENT DOCUMENTS

| AT | 254689 | 6/1967 |
|---|---|---|
| DE | 2251758 | 5/1974 |
| GB | 884180 | 12/1961 |
| GB | 1036974 | 7/1966 |

* cited by examiner

*Primary Examiner* — WB Perkey
(74) *Attorney, Agent, or Firm* — Foley & Lardner LLP

(57) ABSTRACT

A central shutter for camera objectives, said central shutter having a ring-shaped leaf carrier (1) surrounding the shutter aperture (2), on which leaf carrier at least two studs (13) are disposed arranged in a circularly symmetrical manner in relation to each other, on which studs sickle-shaped shutter leaves (14) are pivotably mounted, and having an electric motor drive pivoting the shutter leaves (14) over the shutter aperture (2), is distinguished in that the drive includes a motorized rotatable winding ring (3) which is realized as a flat ring disk and rests on the leaf carrier (1), a cam ring (7) realized as a flat ring disk is rotatably mounted in the winding ring (3), sawtooth-shaped cams (17) being provided on a ring surface thereof, wherein the winding ring (3) and the cam ring (7) are coupled to each other by means of at least one tension spring (9) that can be tensioned in the direction of rotation of the winding ring (3) and the pivoting movement of the shutter leaves (14) can be controlled by coupling to the cam ring (7).

8 Claims, 4 Drawing Sheets

CENTRAL SHUTTER FOR CAMERA OBJECTIVES

The invention relates to a central shutter for camera objectives, said central shutter having a ring-shaped leaf carrier surrounding the shutter aperture, on which leaf carrier at least two studs are disposed arranged in a circularly symmetrical manner in relation to each other, on which studs sickle-shaped shutter leaves are pivotably mounted, and having an electric motor drive pivoting the shutter leaves over the shutter aperture.

AT 254 689 makes known a self-cocking central shutter for photographic purposes, where a base plate includes a central light transmission aperture. Two shutter leaves are mounted on the base plate so as to be pivotable about stationary studs that are located diametrically in relation to each other. A leaf activating part, realized as a drive ring, is provided for pivoting the shutter leaves out of the closed position into the open position and vice versa. The drive ring is mounted so as to be pivotable about a flange of the base plate surrounding the light transmission aperture. It has arms, which are located diametrically opposite each other and engage in slots in the shutter leaves by way of bolts located fixedly in said arms. The slots extend radially in relation to the studs, about which the shutter leaves are pivotable. The bolts are guided in circular arc-shaped slots in the base plate.

A lever mechanism, which has a driving lever, serves for pivoting the drive ring. The driving lever is mounted so as to be pivotable about an axis of rotation located in the base plate and is loaded by a tension spring. The driving lever together with an oscillating lever forms a toggle pair. The oscillating lever is pivotably coupled to the drive ring. A manually actuatable cocking lever and releasing lever are coupled to the driving lever.

During cocking, the tension spring fastened on the driving lever is tensioned and the oscillating lever fastened on the drive ring pulls the shutter leaves into the open position. During releasing, the driving lever is pulled back by the tension of the spring and the oscillating lever rotates the drive ring back into the closed position.

The amount of time and money spent on mechanical parts is large and the plurality of bearing and guiding elements increases the risk of the accelerated parts wearing and oscillating. The short aperture times achievable are not satisfactory.

DE 2 251 758 makes known a photographic central shutter where several bolts are arranged distributed in a circularly symmetrical manner on a leaf supporting ring as pivot bearings for the shutter leaves. The shutter leaves include, in each case, a hole, which is at a spacing from the pivot bearing in the radial direction and in which, in each case, a bolt fastened on a drive ring engages. The drive ring can be adjusted forward and backward via a motor-driven lever gear, as a result of which the shutter leaves are moved into the shutter aperture and out of said shutter aperture.

The direction of rotation of the drive motor has to be reversed for opening and closing the central shutter. The dead times inevitably generated in this case restrict the short aperture times achievable. Powerful motors with a corresponding energy requirement are necessary for a rapidly accelerated rotation of the drive ring. The motor and a battery for power generation are arranged in the camera housing and are coupled to the central shutter by means of gears. The forces acting on the drive holes as the shutter leaves are accelerated are great and result in early wear and in relatively loud noises.

Consequently, the object underlying the invention was to reduce expenditure on components and consequently to scale down the installation space, to reduce the power consumption of the drive motors and at the same time to reduce the short aperture times further. The transmission of force when pivoting the shutter leaves should be low in wear, noise and vibration. It should be possible to insert the central shutter with its electromotive drives as a compact assembly into interchangeable lenses for photographic cameras.

This object is achieved as claimed in the invention with a central shutter of the aforementioned type through the characteristic features of claim 1. Advantageous further developments are produced from the features of the subclaims.

The core concept of the invention lies in the dividing of the drive for pivoting the shutter leaves into two parts. The motor-rotatable winding ring is able to be driven continuously and independently of the movement of the shutter leaves using a motor that consumes less power. With the cam ring blocked, the tension spring suspended between the two elements can be tensioned by rotating the winding ring. The power then stored in the tension springs subsequently serves, once the cam ring is released, for pivoting the shutter leaves that are coupled to the cam ring.

The small amount of electric current required for driving the motor can be transmitted safely from a battery accommodated in the camera housing by means of contacts in the lock-on plane of the interchangeable lens. In the case of higher current intensities for strong motors with rapid response times, there is the risk that the contacts can become hot and damaged if the contact points are faulty.

The winding ring is realized in an expedient manner as a toothed wheel with a toothed ring mounted on the outer circumference. It can be moved into engagement with the motor by means of suitable gearing.

The sawtooth-shaped cams on the cam ring are realized such that the front flank in the direction of rotation predetermined by the tensioning direction of the tension springs is the steepest. To block the rotatability of the cam ring in relation to the leaf carrier, at least one catch, which can engage between the cams and can come to abut against a front flank of the cams, is pivotably mounted on the leaf carrier.

The catch is to be positioned, in this case, such that when it abuts against a front flank of a cam, it holds the shutter leaves coupled to the cam ring in a position closing the shutter aperture and / or in a position pivoted out of the shutter aperture.

In an advantageous manner, a separate release catch is provided for the closed position and a separate detent catch is provided for the open position of the shutter leaves. The pivoting movement of the one or more catches can be controlled by a motor.

In a particular embodiment, the coupling between the shutter leaves and the cam ring consists in that the shutter leaves are connected to a pre-biased spring-loaded pivot lever such that when the cam ring is rotated, said pivot lever pivots the shutter leaves into the open position by means of a front flank of a cam in opposition to the pre-biased spring loading, and when a cam head is passed over, pivots the shutter leaves back into the closed position by means of its pre-biased spring loading. A release catch is positioned, in this case, such that in the pivoted-in state, it holds the shutter leaves in the closed position. A detent catch is positioned such that in the pivoted-in state, it holds the pivot lever bearing on a cam head and consequently holds the shutter leaves in the open position.

A schematic representation of an exemplary embodiment of the central shutter as claimed in the invention is shown in the drawing and is described below by way of the figures, in which, in detail:

Figure 1:
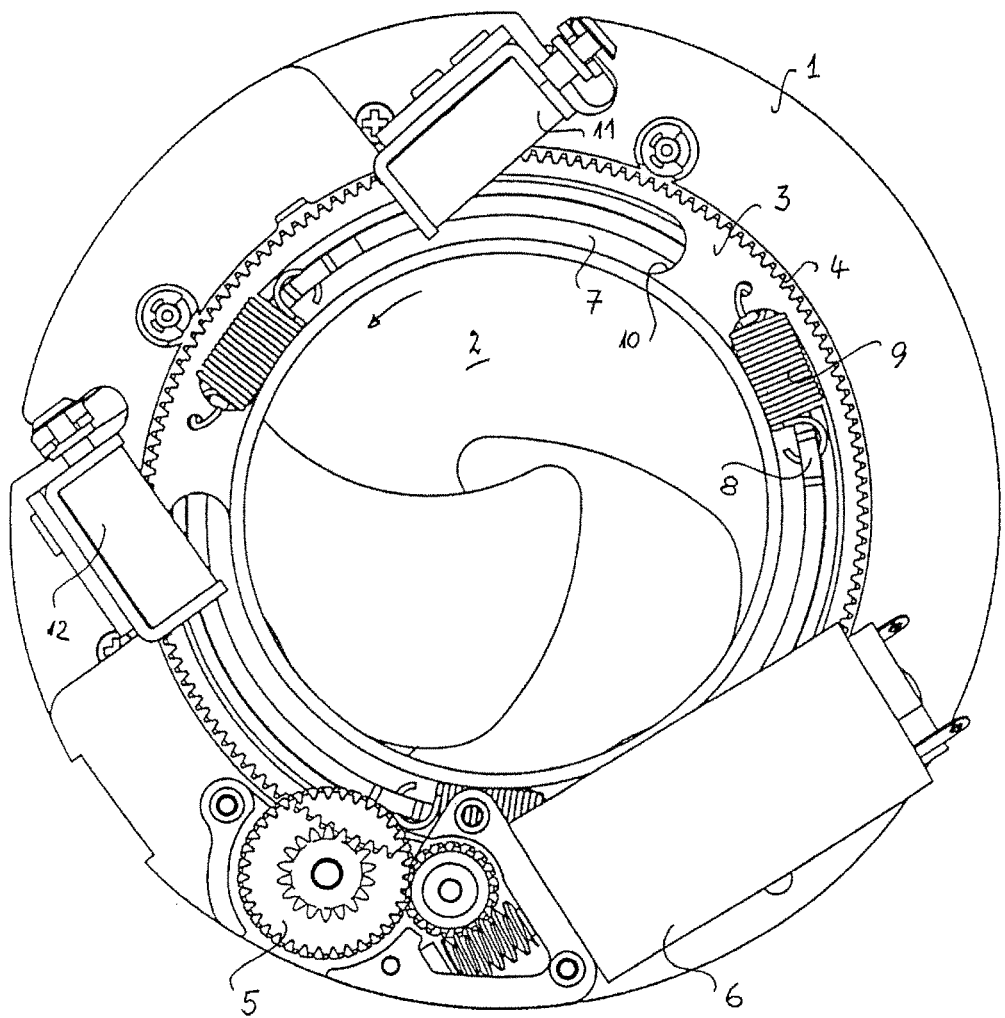
FIG. 1 shows the drive end of the leaf carrier.

The ring-shaped leaf carrier 1 shown in FIG. 1 surrounds the shutter aperture 2. A winding ring 3 is inserted into the leaf carrier 1 into the part adjoining the shutter aperture 2. The winding ring 3 is realized as a flat ring disk, which bears a toothed ring 4 on its outer circumference.

The toothed ring 4 meshes with motorized gearing 5, which is driven by an electric motor 6.

A cam ring 7, also realized as a flat ring disk, is rotatably mounted in the winding ring 3. This representation only shows a web-shaped ring 8 from the cam ring 7, a tension spring 9 being suspended in said web-shaped ring. The tension spring 9 is suspended in the winding ring 3 by way of its other end. After blocking the rotatability of the cam ring 7, the web-shaped ring 8 moves in the direction represented by an arrow in a circular segment-shaped cutout 10 in the winding ring 3 when the tension spring 9 is tensioned.

Servomotors 11, 12 for actuating catches that interact with the cam ring 7 are also arranged additionally at the drive end of the leaf carrier 1 represented in FIG. 1.

Figure 2:
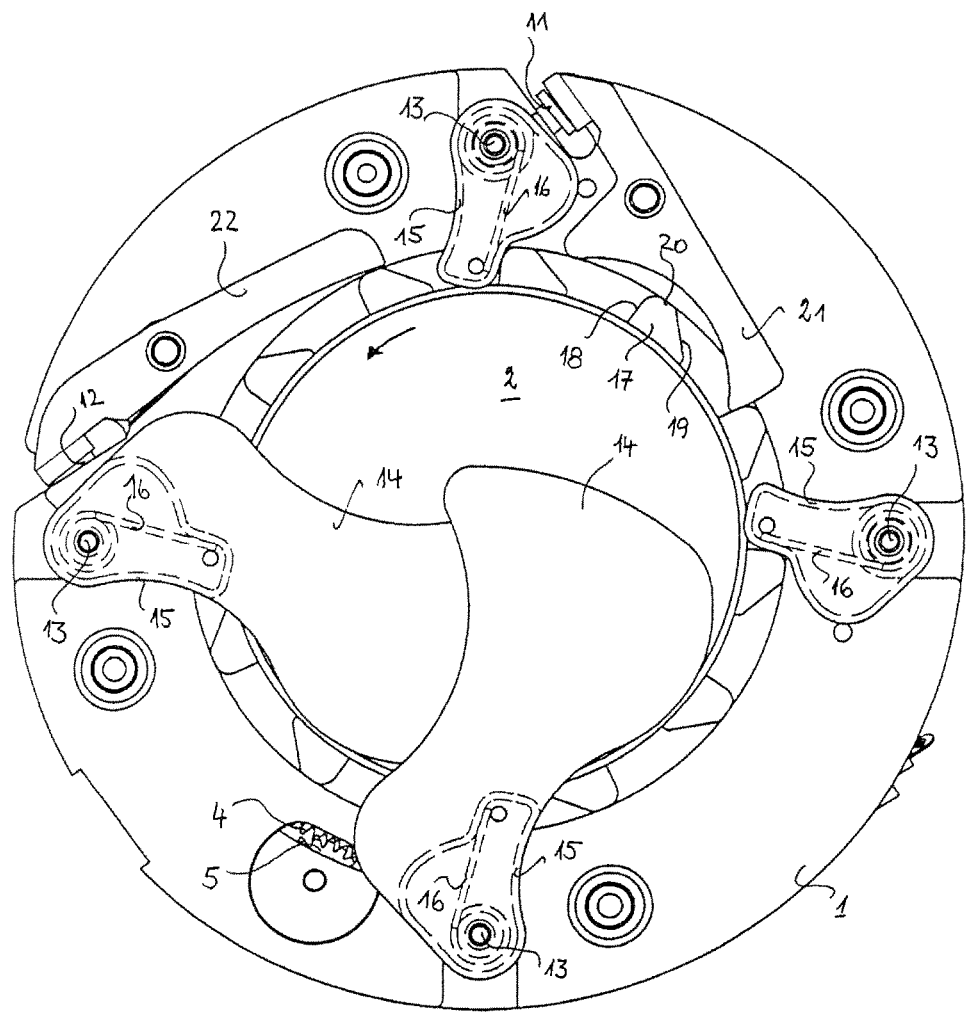
FIG. 2 shows the leaf end of the leaf carrier with the shutter leaves pivoted into the shutter aperture.

FIG. 2 shows a phantom view through the drive end of the leaf end of the leaf carrier 1 lying behind the drive end. The position of the elements shown at the leaf end corresponds directly with the associated parts that lie in the plane of the drive end, as can be seen by the motorized gearing 5 and the toothed ring 4 represented in the manner of a cutout.

Four studs 13 are arranged in a circularly symmetrical manner to each other on the leaf carrier 1 and sickle-shaped shutter leaves 14 are pivotably mounted on said studs. The shutter leaves 14 are connected in each case to pivot levers 15, which, by means of a torsion spring 16 pushed onto the stud 13, are held at a pre-bias which pivots the pivot levers and consequently the shutter leaves 14 into the shutter aperture 2.

Cams 17 can be seen lying on the cam ring 7 in this representation, the front flank 18 of which cams, when seen in the direction of rotation, is steeper than the rear flank 19. The cam head 20 forming the transition from the front to the rear flank is rounded. The cam heads 20 rest on a ring concentrically in relation to the middle of the shutter aperture 2.

A release catch 21 and a detent catch 22 are also pivotably mounted on the leaf carrier 1. The pivot position of the catches 21, 22 can be modified in a motor-driven manner by the servomotors 11, 12. In the pivot position shown in FIG. 2, the release catch 21 abuts against a front flank 18 of a cam 17 and consequently blocks the rotatability of the cam ring 7. The detent catch 22 rests on a cam head 20 and, when the rotation of the cam ring 7 is released, can be pivoted into the subsequent space between consecutive cams 17.

Figure 3:
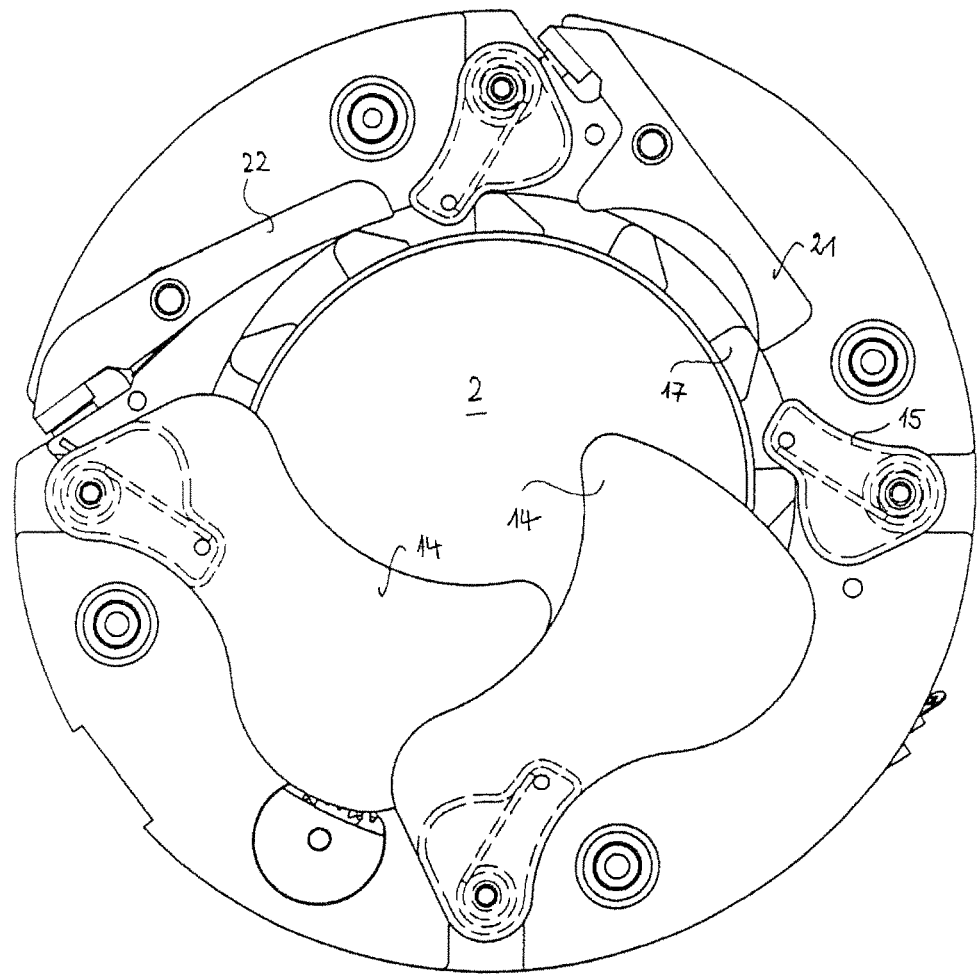
FIG. 3 shows the leaf end with the shutter leaves partially pivoted-out and FIG. 4 shows the leaf end with the shutter leaves pivoted out of the shutter aperture.

In the case of the position of the release catch 21 shown in FIG. 2, the pivot levers 15 abut, in each case, against a front flank 18 of a cam 17 and are thereby coupled to the cam ring 7. When the rotatability of the cam ring 7 is released by pivoting out the release catch 21, the cams 17 moving in the direction of the arrow raise the pivot levers 15 and pivot the shutter leaves 14 connected thereto out of the shutter aperture 2 (FIG. 3).

Figure 4:
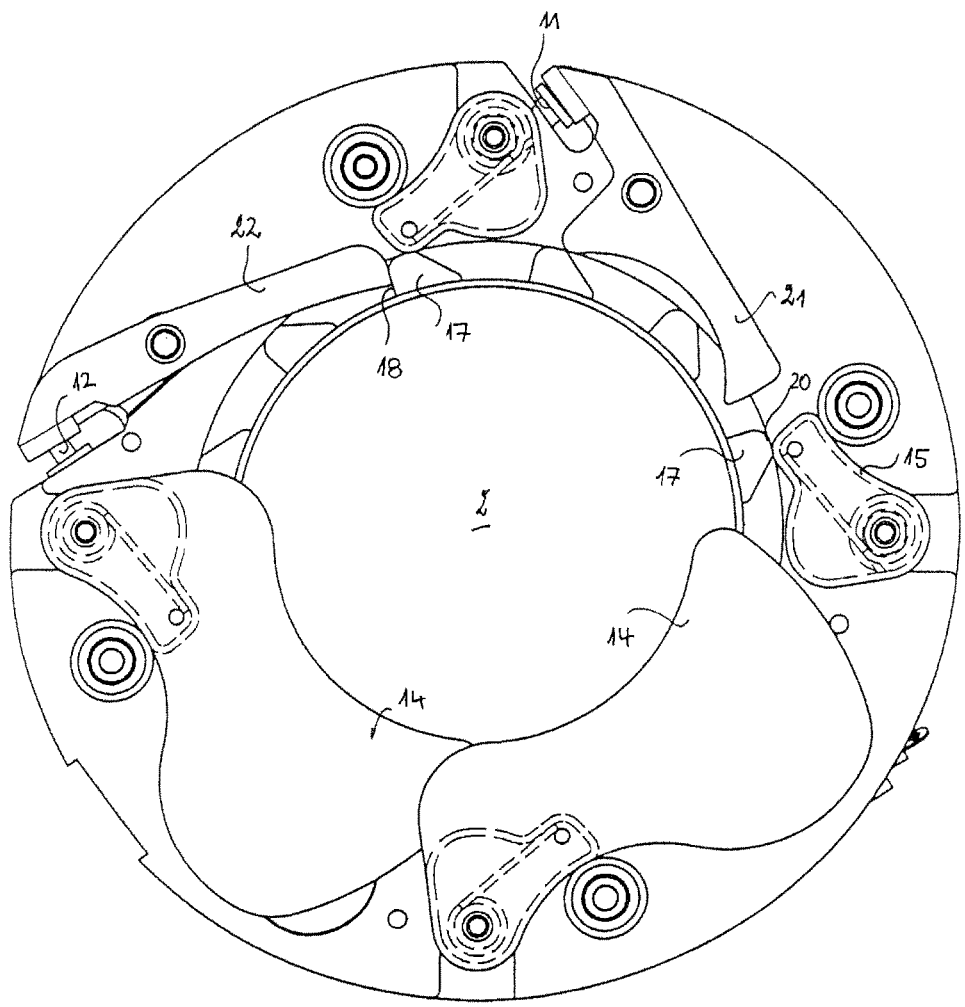

In the case of the shutter position shown in FIG. 4, the detent catch 22 has engaged between two cams 17 and abuts against a front flank 18 of a cam 17. The detent catch 22 is positioned and dimensioned such that in the position shown, the pivot levers 15 rest on a cam head 20 at the same time. This is the position in which the shutter leaves 14 have been completely pivoted out of the shutter aperture 2. When installing the central shutter into a lens for a reflex camera, this position can be used in particular for getting the subject in view.

Once the detent catch 22 has been pivoted out, the cam ring 7, under the effect of the tensioned tension spring 9, is able to rotate further in the direction of the arrow. At the same time, the pivot levers 15, under the effect of the torsion springs 16, fall back along the rear flank 19 of the cams 17 into the shutter position and by abutting against a front flank 18 of the cams 17, the release catch 21 once again blocks the cam ring 7. During the shutter sequence, the tension springs 9 can be tensioned again as far as into an end position such that the central shutter is prepared for a further shutter sequence.

LIST OF REFERENCES

1 Leaf carrier
2 Shutter aperture
3 Winding ring
4 Toothed ring
5 Motorized gearing
6 Electric motor
7 Cam ring
8 Web-shaped ring
9 Tension spring
10 Circular segment-shaped cutout
11,12 Servomotors
13 Studs
14 Shutter leaves
15 Pivot lever
16 Torsion spring
17 Cam
18 Front flank of the cams
19 Rear flank of the cams
20 Cam head
21 Release catch
22 Detent catch

The invention claimed is:

1. A central shutter for a camera objective, said central shutter comprising:
 a ring-shaped leaf carrier surrounding a shutter aperture;
 at least two studs disposed on the leaf carrier, the at least two studs being arranged in a circularly symmetrical manner in relation to each other;
 a plurality of sickle-shaped shutter leaves pivotably mounted on the at least two studs;
 a motor-driven drive configured to pivot the shutter leaves over the shutter aperture, the drive including:
  a motorized rotatable winding ring that comprises a flat ring disk and rests on the leaf carrier, and
  a cam ring that comprises a flat ring disk and is rotatably mounted in the winding ring, the cam ring including a plurality of cams on a ring surface of the cam ring,
 wherein the winding ring and the cam ring are coupled to each other via at least one tension spring that is tensionable in a direction of rotation of the winding ring,
 wherein the cam ring is configured to control pivoting movement of the plurality of shutter leaves, and
 wherein the shutter leaves are connected to a pre-biased spring-loaded pivot lever such that:
  when the cam ring is rotated, said pivot lever pivots the shutter leaves into an open position via a front flank of at least one of the cams, and
  when the at least one of the cams is passed over, said pivot lever pivots the shutter leaves into the closed position.

2. The central shutter as claimed in claim 1, wherein the winding ring comprises a toothed ring on an outer circumference of the winding ring, the toothed ring being configured to engage motorized gearing.

3. The central shutter as claimed in claim 1, wherein a front flank of the cams is steeper than a rear flank of the cams, in the direction of rotation of the cam ring.

4. The central shutter as claimed in claim 1, wherein rotation of the cam ring is blockable in relation to the leaf carrier.

5. The central shutter as claimed in claim 1, further comprising at least one catch that is pivotably mounted on the leaf carrier and configured to block the cam ring by abutment against a front flank of at least one of the cams, in the direction of rotation.

6. The central shutter as claimed in claim 5, wherein the at least one catch is positioned such that when the at least one catch abuts against a front flank of at least one of the cams, the at least one catch holds the shutter leaves coupled to the cam ring in at least one of (i) a position closing the shutter aperture and (ii) a position pivoted out of the shutter aperture.

7. The central shutter as claimed in claim 6, further comprising a release catch configured to maintain the shutter leaves in a closed position and a detent catch configured to maintain the shutter leaves in an open position.

8. The central shutter as claimed in claim 5, wherein a pivoting movement of the at least one catch is controllable by an additional motor.

* * * * *